US012091145B2

(12) United States Patent
Ishizaka et al.

(10) Patent No.: US 12,091,145 B2
(45) Date of Patent: Sep. 17, 2024

(54) OUTBOARD MACHINE

(71) Applicant: HONDA MOTOR CO., LTD., Tokyo (JP)

(72) Inventors: Kazuhiro Ishizaka, Wako (JP); Tatsuya Kuroda, Wako (JP); Sohei Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 463 days.

(21) Appl. No.: 17/442,816

(22) PCT Filed: Dec. 23, 2019

(86) PCT No.: PCT/JP2019/050371
§ 371 (c)(1),
(2) Date: Sep. 24, 2021

(87) PCT Pub. No.: WO2020/202668
PCT Pub. Date: Oct. 8, 2020

(65) Prior Publication Data

US 2022/0185440 A1 Jun. 16, 2022

(30) Foreign Application Priority Data

Mar. 29, 2019 (JP) ................................ 2019-066156

(51) Int. Cl.
*B63H 20/24* (2006.01)
*F01N 13/12* (2010.01)
*F02B 61/04* (2006.01)

(52) U.S. Cl.
CPC ........... *B63H 20/245* (2013.01); *F01N 13/12* (2013.01); *F02B 61/045* (2013.01); *F01N 2590/021* (2013.01)

(58) Field of Classification Search
CPC ...... B63H 20/00; B63H 20/24; B63H 20/245; B63H 21/00; B63H 21/32; B63H 21/38; F01N 3/00; F01N 3/28; F01N 13/00; F01N 13/12; F01N 2590/021; F02B 61/00; F02B 61/045; F02B 67/00
(Continued)

(56) References Cited

U.S. PATENT DOCUMENTS 5,100,351 A * 3/1992 Shibata ................ B63H 20/245 440/89 R

FOREIGN PATENT DOCUMENTS

JP H03-23308 1/1991
JP H06-146876 5/1994
(Continued)

OTHER PUBLICATIONS

International Search Report, Date of mailing: Mar. 17, 2020, 2 pages.
(Continued)

*Primary Examiner* — Lars A Olson
(74) *Attorney, Agent, or Firm* — Rankin, Hill & Clark LLP

(57) ABSTRACT

An exhaust pipe has an upstream-side exhaust pipe extending downward from an engine to house a catalyst for exhaust gas purification, and a downstream-side exhaust pipe located downstream of the upstream-side exhaust pipe, and extending upward from the catalyst and then bending downward. Under a configuration in which an exhaust pipe is disposed below an engine, with a simple configuration, a catalyst is hardly exposed to water.

16 Claims, 6 Drawing Sheets

(58) Field of Classification Search
USPC ........................................................ 440/89 R
See application file for complete search history.

(56) References Cited

FOREIGN PATENT DOCUMENTS

| | | |
|---|---|---|
| JP | H09-42009 | 2/1997 |
| JP | H09-156594 | 6/1997 |
| JP | 2010-248915 | 11/2010 |

OTHER PUBLICATIONS

Written Opinion of the International Searching Authority dated Mar. 18, 2020 in PCT/JP2019/050371, 4 pages.
Japanese Office Action dated Oct. 25, 2022 issued in corresponding Japanese application No. 2019-066156; English machine translation included (9 pages).
International Preliminary Report on Patentability dated Oct. 14, 2021, 8 pages.

* cited by examiner

OUTBOARD MACHINE

TECHNICAL FIELD

The present invention relates to an outboard machine.

BACKGROUND ART

There is a type of outboard machine in which an engine is included at a position higher than a water surface and in which an exhaust pipe forming an exhaust system of the engine is disposed in a space below the engine, a configuration of which has been proposed in which a catalyst for exhaust gas purification is disposed in this type of exhaust pipe (for example, Patent Literature 1). In the outboard machine described in Patent Literature 1, exhaust gas from the engine flows downward from an exhaust introduction pipe to enter a first chamber. The exhaust gas reverses its course in the first chamber to flow upward into a catalyst where it is secondarily purified. Thereafter, the exhaust gas enters a second chamber where it further reverses its course, to flow downward again into the exhaust introduction pipe.

CITATION LIST

Patent Literature

[Patent Literature 1]
Japanese Patent Laid-Open No. 9-156594

SUMMARY OF INVENTION

Technical Problem

When the catalyst is disposed near the engine, an upper part of the outboard machine increases in size, and the lateral width of the outboard machine also expands. In addition, the temperature of the catalyst easily becomes high due to heat of the engine. A plurality of outboard machines may be set depending on the vessel, and steering of the outboard machines is implemented by swaying all of the outboard machines or some of the outboard machines in the left-right direction. Thus, a larger lateral width of the outboard machine is more likely to interfere with the next outboard machine.

On the other hand, as described in Patent Literature 1, when the catalyst is disposed below the engine, the catalyst is easily exposed to water. In the outboard machine described in Patent Literature 1, when the water surface rises to the height of the catalyst, the catalyst may be exposed to water. Furthermore, the direction of the exhaust gas is reversed upward to cause the exhaust gas to pass through the catalyst, and thereafter the exhaust gas is reversed to flow downward; accordingly, the exhaust structure tends to be complicated and increased in size. In particular, in the outboard machine, a space below the engine is restricted, so that it may be hard to adopt the exhaust structure described in Patent Literature 1.

Thus, an object of the present invention is to, under a configuration in which an exhaust pipe is disposed below an engine, with a simple configuration, make it hard for a catalyst to be exposed to water.

Solution to Problem

All contents of Japanese Patent Application No. 2019-066156 filed on Mar. 29, 2019 are incorporated herein.

To achieve the above object, in an outboard machine including an engine provided at a position higher than a water surface, and an exhaust pipe disposed in a space below the engine, the exhaust pipe has an upstream-side exhaust pipe extending downward from the engine to house a catalyst for exhaust gas purification, and a downstream-side exhaust pipe located downstream of the upstream-side exhaust pipe, and extending upward from the catalyst and then bending downward.

In the above configuration, an uppermost part of the downstream-side exhaust pipe is located above a draft surface of the outboard machine.

Furthermore, in the above configuration, at least a part of the catalyst is located below a draft surface on an Hi side indicating a water surface during either idling or trolling.

Furthermore, in the above configuration, the outboard machine is configured to circulate oil in the engine by a dry sump method, and the catalyst is disposed at a position of, in the horizontal direction, overlapping with an oil pan provided at a lower part of the engine.

Furthermore, in the above configuration, the catalyst is disposed at a position of overlapping with the oil pan in the front-rear direction of the outboard machine, and the downstream-side exhaust pipe is disposed at a position of overlapping with the oil pan in the left-right direction of the outboard machine.

Furthermore, in the above configuration, the upstream-side exhaust pipe has, above the catalyst, a communication hole allowing communication between the inside of the upstream-side exhaust pipe and the outside of the upstream-side exhaust pipe.

Furthermore, in the above configuration, the downstream-side exhaust pipe has a rotary exhaust pipe part forming an exhaust path that rotates exhaust gas in the up-down direction once or more. Furthermore, in the above configuration, the rotary exhaust pipe part is provided with a drain hole.

Advantageous Effect of Invention

According to an aspect of the present invention, under the configuration in which the exhaust pipe is disposed below the engine, with the simple configuration, the catalyst is hardly exposed to water.

DESCRIPTION OF EMBODIMENT

Hereinafter, an embodiment of the present invention will be described with reference to the drawings.

Figure 1:
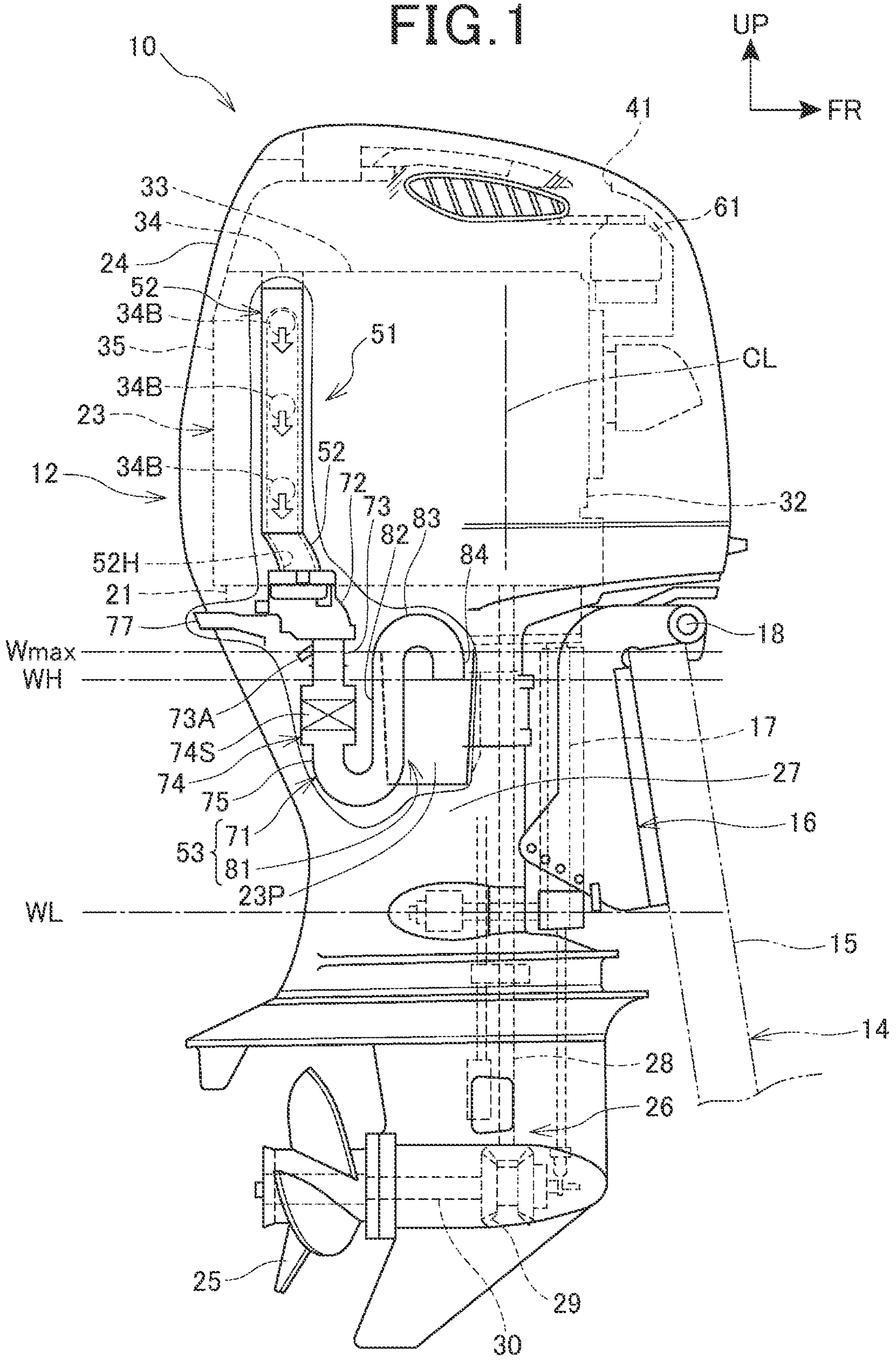
FIG. 1 is a partial cross-sectional view when an outboard machine according to an embodiment of the present invention is seen from the right side.

FIG. 1 is a partial cross-sectional view when an outboard machine according to the embodiment of the present invention is seen from the right side.

An outboard machine 10 includes an outboard machine body 12 and an attachment part 16 to be attached to a vessel 14. The vessel 14 is, for example, a small vessel with a gross tonnage of less than 20 tons. Each of the directions in the description is a direction based on the outboard machine 10. In FIG. 1 and each of the drawings described later, reference sign FR indicates the front direction of the outboard machine 10, reference sign UP indicates the upper direction of the outboard machine 10, and reference sign LH indicates the left direction of the outboard machine 10.

The attachment part 16 includes a swivel shaft 17 formed in a vertical axis extending in the up-down direction, and a tilt shaft 18 extending in the left-right direction, and is attached to a stern 15 of the vessel 14.

The outboard machine body 12 includes a mount case 21 provided at the attachment part 16. The outboard machine body 12 can swing in the left-right direction (horizontal direction) based on the swivel shaft 17 and swing in the up-down direction based on the tilt shaft 18, with respect to the mount case 21. Thus, the outboard machine body 12 is attached swingably in the left-right direction and the up-down direction with respect to the vessel 14.

An engine 23 is supported on the mount case 21. The engine 23 is disposed at a position higher than a water surface of the outboard machine 10 and covered with an engine cover 24 forming an upper-side exterior cover of the outboard machine 10. In the engine cover 24, in addition to the engine 23, there are disposed intake system components 41, exhaust system components 51, auxiliaries 61, and the like of the engine 23. Each of the engine 23 and the engine cover 24 is at a position higher than the water surface, and each of components in the engine cover 24 including the engine 23 is hardly exposed to water.

FIG. 1 indicates a draft surface WL on an Lo side indicating a water surface when the vessel 14 is in a state of running by means of the outboard machine 10, a draft surface WH on an Hi side indicating a water surface during either idling or trolling of the outboard machine 10, and a maximum draft surface Wmax indicating the highest water surface of the outboard machine 10. The draft surface is also referred to as a waterline or a draft level.

Below the mount case 21, a power transmission mechanism 26 that transmits a driving force of the engine 23 to a propeller 25 is provided. The power transmission mechanism 26 is covered with an extension cover 27. The power transmission mechanism 26 includes a driving shaft 28 extending downward in parallel to the swivel shaft 17 behind the swivel shaft 17, and a propeller shaft 30 coupled to a lower part of the driving shaft 28 via a shift mechanism 29 and extending rearward from the shift mechanism 29. The driving shaft 28 is rotationally driven by the engine 23, and the rotation of the driving shaft 28 is transmitted to the propeller shaft 30 via the shift mechanism 29. The shift mechanism 29 switches the shift position to one of forward, reverse, and neutral.

The propeller 25 is attached to a rear end of the propeller shaft 30. When the vessel 14 is moved forward or backward, the propeller 25 is located in water, and the axis line of the propeller shaft 30 is set to be substantially parallel to the traveling direction of the vessel 14. The propeller 25 is rotationally driven to thereby generate propulsion that moves the vessel 14 forward or backward. A known configuration is widely applicable to the configuration of the power transmission mechanism 26.

The engine 23 is an internal combustion engine, which is a multi-cylinder gasoline engine in the present embodiment. The engine 23 includes a crankcase 32 that rotatably supports a crankshaft (an axis line CL of the crankshaft is indicated in FIG. 1) in a state where the crankshaft is directed in the up-down direction, a cylinder block 33 integrally or separately provided in a rear part of the crankcase 32, a cylinder head 34 coupled to the cylinder block 33 from behind, and a head cover 35 coupled to the cylinder head 34 from behind.

In the cylinder head 34, exhaust ports 34B communicating with respective cylinders provided in the cylinder block 33 are provided at intervals in the up-down direction. Each of the exhaust ports 34B is open on a right-side surface of the cylinder head 34, and the exhaust system components 51 are coupled to the exhaust ports 34B.

On a left-side surface of the cylinder head 34, intake ports communicating with the respective cylinders are open, and the intake system components 41 are coupled to the intake ports. The head cover 35 houses a valve operating mechanism that opens and closes each of the exhaust ports 34B and each of the intake ports, between the head cover 35 and the cylinder head 34. The number of the cylinders, arrangement of the cylinders, and the like of the engine 23 are not particularly limited.

The intake system components 41 are components that supply to the engine 23 an air-fuel mixture in which fuel and air are mixed, and include a throttle device that adjusts a supply amount of the air-fuel mixture, a fuel injection device that adjusts an amount of fuel injected into the engine 23, and the like.

The exhaust system components 51 include an exhaust manifold 52 coupled to the engine 23, and an exhaust pipe 53 extending from the exhaust manifold 52.

The exhaust manifold 52 is provided on a surface (right-side surface) on the exhaust port 34B side of the cylinder head 34 and formed in a hollow box shape extending in the up-down direction. The exhaust manifold 52 functions as an exhaust gas collector that collects exhaust gas passing through each of the exhaust ports 34B. An exhaust outlet 52H that discharges the collected exhaust gas is provided at a lowermost part of the exhaust manifold 52.

The exhaust manifold 52 may be formed integrally with the cylinder head 34 or may be formed separately from the cylinder head 34.

Figure 2:
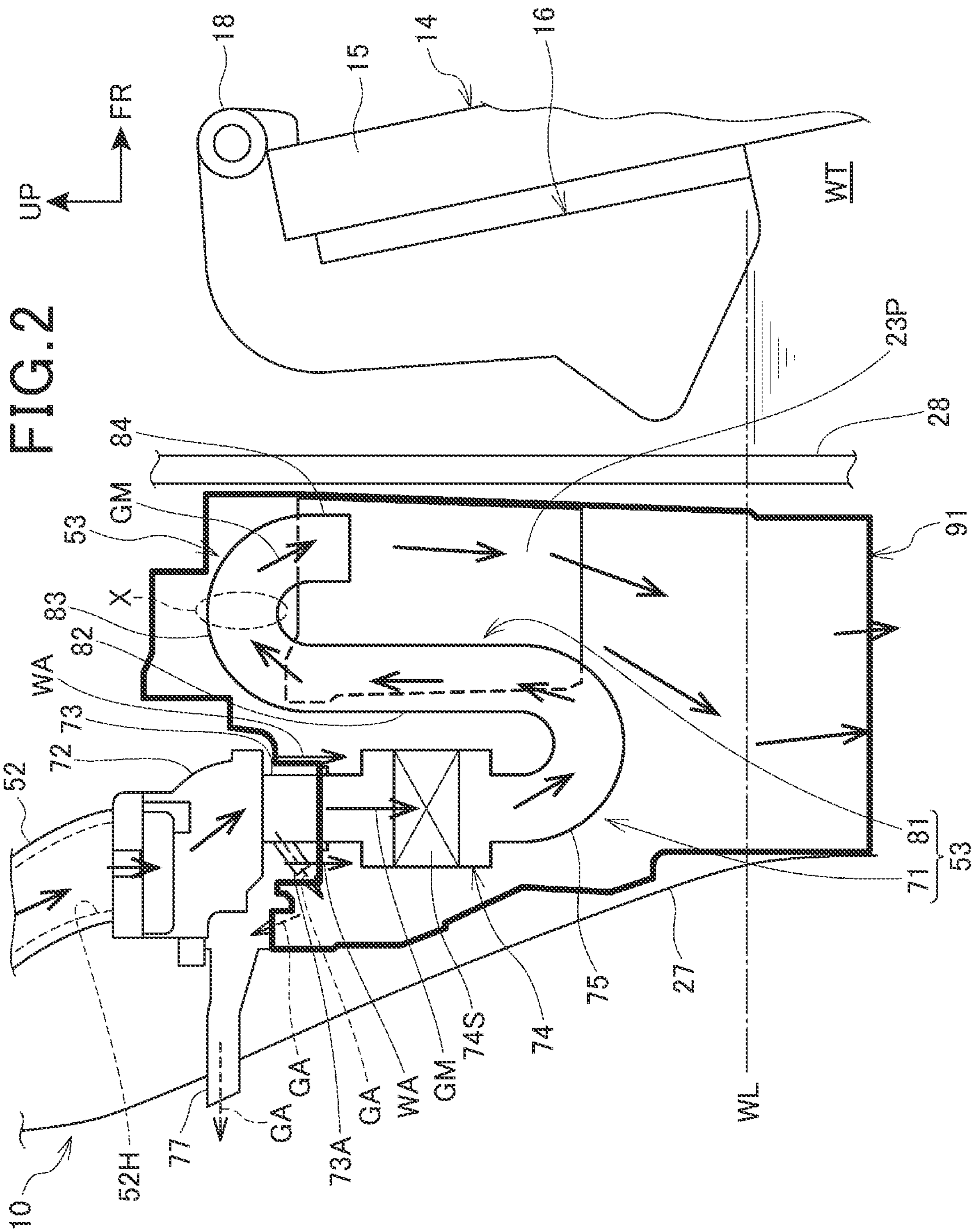
FIG. 2 is a view when an exhaust pipe is seen from the right side, together with a peripheral configuration.
Figure 3:
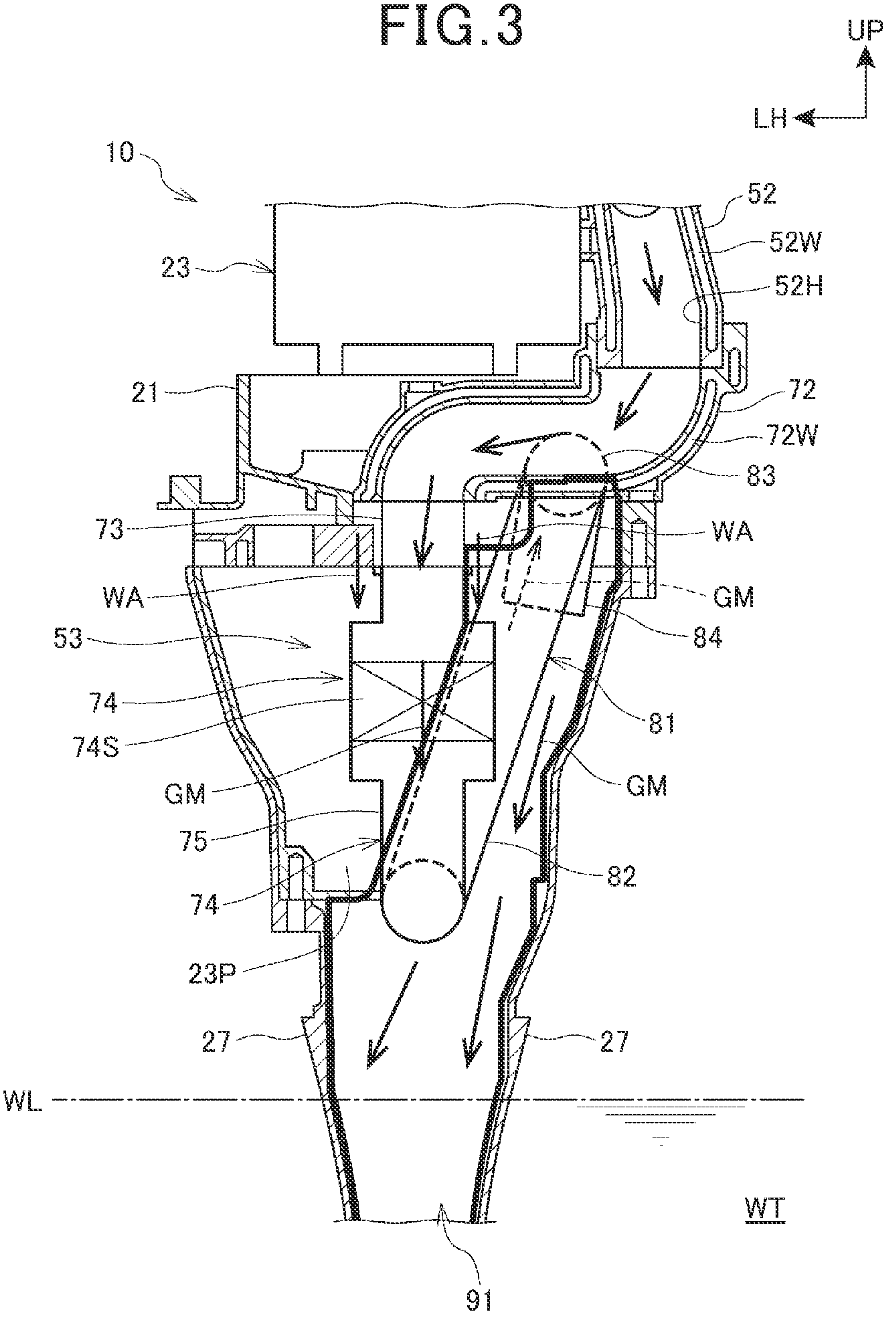
FIG. 3 is a view when the exhaust pipe is seen from the rear side, together with the peripheral configuration.

FIG. 2 is a view when the exhaust pipe 53 is seen from the right side, together with a peripheral configuration, and FIG. 3 is a view when it is seen from the rear side. The exhaust pipe 53 is disposed in a space below the engine 23. In FIGS. 2 and 3, a flow of exhaust gas in the case of the draft surface WL on the Lo side is indicated by arrows GM and GA. The arrow GM indicates a main flow of the exhaust gas, and the arrow GA indicates a sub-flow of the exhaust gas. The sub-flow GA is a flow that occurs when pressure of the exhaust gas is relatively low (for example, during idling).

The exhaust pipe 53 includes an upstream-side exhaust pipe 71 extending downward from the exhaust manifold 52, and a downstream-side exhaust pipe 81 extending upward from a lower end of the upstream-side exhaust pipe 71. The upstream-side exhaust pipe 71 has an exhaust guide 72 coupled to the exhaust outlet 52H of the exhaust manifold 52, a first upstream-side exhaust pipe 73 continuous with a lower end serving as a downstream end of the exhaust guide 72, a catalyst converter 74 continuous with a lower end serving as a downstream end of the first upstream-side exhaust pipe 73, and a second upstream-side exhaust pipe 75 continuous with a lower end serving as a downstream end of the catalyst converter 74.

The exhaust guide 72 functions as a relay pipe that relays connection between the exhaust manifold 52 and the first upstream-side exhaust pipe 73. The exhaust guide 72 is formed in a cylindrical shape extending from the exhaust outlet 52H of the exhaust manifold 52 toward the rear side of the engine 23 and toward a left-right middle position of the engine 23 (which coincides with a left-right middle position of the outboard machine 10). For example, the exhaust guide 72 is prepared by cast molding of a metal material such as aluminum alloy.

The exhaust guide 72 is, for example, prepared for each different engine. Changing the exhaust guide 72 for each engine allows the components downstream of the exhaust guide 72 (from the first upstream-side exhaust pipe 73 to the downstream-side exhaust pipe 81) to be shared between a plurality of kinds of engines.

As illustrated in FIG. 3, a water jacket 72W is provided in the exhaust guide 72 of the present embodiment. Furthermore, a water jacket 52W is also provided in each part of the engine 23 and the exhaust manifold 52.

Each of the water jackets 52W and 72W is supplied with surrounding water discharged by a not-illustrated water pump included in the outboard machine 10 and water-cools the engine 23. The water that has cooled the engine 23 is discharged from the water jacket 72W of the exhaust guide 72. An engine cooling water W (see FIGS. 2 and 3) discharged from the exhaust guide 72 cools the components below the exhaust guide 72 (the first upstream-side exhaust pipe 73, the catalyst converter 74, and the like), preventing excessive increases in the temperatures of these components.

As illustrated in FIGS. 2 and 3, the first upstream-side exhaust pipe 73 is formed of a metal pipe made of a metal material such as stainless steel alloy and linearly extends downward. The first upstream-side exhaust pipe 73 is disposed behind the mount case 21 and at a left-right center of each of the engine 23 and the outboard machine 10.

The outboard machine 10 of the present embodiment is configured to circulate oil in the engine 23 by a dry sump method. Thus, an oil pan 23P provided at a lower part of the engine 23 is downsized as compared with a wet sump method. As illustrated in FIG. 2, the oil pan 23P is disposed near the swivel shaft 17 disposed at a front-rear center of the outboard machine 10 or toward the front, so that it becomes easier to secure a vacant space behind the oil pan 23P due to provision of the oil pan 23P toward the front side.

As described above, since the first upstream-side exhaust pipe 73 is disposed behind the mount case 21 and at the left-right center of the engine 23, the catalyst converter 74, which is a relatively large component, can be disposed in the vacant space behind the oil pan 23P, without bending the first upstream-side exhaust pipe 73. As illustrated in FIG. 3, in the present embodiment, each of the catalyst converter 74, the first upstream-side exhaust pipe 73, and the second upstream-side exhaust pipe 75 is disposed at a position of overlapping with the oil pan 23P in the front-rear direction of the outboard machine 10.

Thus, in the present configuration, a space around the oil pan 23P is effectively used for an arrangement space for the catalyst converter 74, the first upstream-side exhaust pipe 73, and the second upstream-side exhaust pipe 75, so that it is possible to suppress an increase in the front-rear length of the outboard machine 10 and an increase in the lateral width thereof.

As illustrated in FIG. 2, the catalyst converter 74 is provided in an upstream-side portion of the exhaust pipe 53, so that the temperature of a catalyst 74S in the catalyst converter 74 can be quickly increased to an activation temperature by high-temperature exhaust gas right after exhausted from the engine 23, and the catalyst 74S can be early activated. Furthermore, the catalyst converter 74 is provided above the draft surface WL on the Lo side, so that the catalyst converter 74 is not immersed in water when the vessel 14 is in a state of running, making it easier to maintain the activation state.

The catalyst 74S is a three-way catalyst that removes harmful components such as hydrocarbon (HC), carbon monoxide (CO), and nitrogen oxide (NOx) in the exhaust gas by oxidation and reduction reactions. The catalyst 74S uses, for example, a honeycomb catalyst structure in which a columnar porous honeycomb structure having an outer diameter substantially same as the inner diameter of a case of the catalyst converter 74 is coated with a catalyst component such as platinum, palladium, or rhodium. As the catalyst 74S and the catalyst converter 74, a known one can be widely used. For example, a plate catalyst in which a catalyst component is supported on punching metal may be used as the catalyst 74S.

The second upstream-side exhaust pipe 75 is formed of a single metal pipe made of a metal material such as aluminum alloy and extends downward from the catalyst converter 74 to be continuous with the downstream-side exhaust pipe 81.

In the present embodiment, the second upstream-side exhaust pipe 75 and the downstream-side exhaust pipe 81 are integrally formed by bending a single metal pipe. A boundary portion between the second upstream-side exhaust pipe 75 and the downstream-side exhaust pipe 81 is formed of a U-shaped bent pipe extending downward from the catalyst converter 74 side and then bending upward and allows exhaust gas to smoothly flow to the downstream-side exhaust pipe 81.

As illustrated in FIG. 2, the downstream-side exhaust pipe 81 has a first downstream-side exhaust pipe 82 extending upward on the side of the oil pan 23P, a downstream-side bent pipe 83 extending upward from an upper end serving as a downstream end of the first downstream-side exhaust pipe 82 and then extending downward, and a second downstream-side exhaust pipe 84 extending downward from a lower end serving as a downstream end of the downstream-side bent pipe 83.

As illustrated in FIG. 3, the first downstream-side exhaust pipe 82 is disposed on either the left or right side of the oil pan 23P (on the right side in the present embodiment) and diagonally extends toward the upper side and either the left or right side along an inclination of a lateral surface of the oil pan 23P. This causes the first downstream-side exhaust pipe 82 to be close to the oil pan 23P, so that the first downstream-side exhaust pipe 82 can be disposed by effectively using a space between the oil pan 23P and the extension cover 27. Thus, at least a part of the downstream-side exhaust pipe 81 is disposed at a position of overlapping with the oil pan 23P in the left-right direction of the outboard machine 10. The first downstream-side exhaust pipe 82 extends to a position higher than the catalyst 74S.

As illustrated in FIG. 2, the downstream-side bent pipe 83 is formed of a U-shaped bent pipe bending toward the upper side and the front side from the first downstream-side exhaust pipe 82 and extending downward and causes exhaust gas to smoothly flow to the second downstream-side exhaust pipe 84. The downstream-side bent pipe 83 forms an uppermost part X of the downstream-side exhaust pipe 81.

The uppermost part X is provided at a position higher than the catalyst 74S, the draft surface WH on the Hi side, and the maximum draft surface Wmax and thus is hardly immersed in water. Furthermore, the uppermost part X is provided at a position of overlapping with the exhaust guide 72 in the vehicle body front-rear direction and thus can be disposed by effectively using a space vacant below the engine 23 and in front of the exhaust guide 72. Thus, the downstream-side bent pipe 83 can be disposed at a relatively high position, so that it is possible to make it hard for water to penetrate into the downstream-side bent pipe 83.

The second downstream-side exhaust pipe 84 extends downward from the downstream-side bent pipe 83. As illustrated in FIG. 1, the second downstream-side exhaust pipe 84 extends to the same height as the draft surface WH on the Hi side and is located at a position higher than the draft surface WL on the Lo side. As illustrated in FIG. 2, exhaust gas from the second downstream-side exhaust pipe 84 is exhausted to an exhaust chamber 91 defined in the extension cover 27. The exhaust chamber 91 is a region defined by the engine 23, the extension cover 27, a not-illustrated partition wall, and the like. Exhaust gas is discharged to an underwater WT via the exhaust chamber 91.

When the vessel 14 is in a state of running, the water surface lowers as compared with during idling or trolling, and thus the water surface becomes at the draft surface WL on the Lo side as illustrated in FIGS. 2 and 3. In this case, the entire exhaust pipe 53 is located above the water surface, so that even in the configuration in which the exhaust pipe 53 is disposed below the engine 23, water hardly penetrates into the exhaust pipe 53. This prevents a situation where the catalyst 74S in the exhaust pipe 53 is exposed to water while the vessel 14 is in a state of running.

The first upstream-side exhaust pipe 73 serving as the upstream-side portion of the exhaust pipe 53 is provided with a bypass passage 73A that functions as a communication hole allowing communication between the inside of the exhaust pipe 53 and the outside thereof. The bypass passage 73A allows communication between the inside of the exhaust pipe 53 and the outside thereof at a position higher than the draft surface WH on the Hi side, so that water hardly penetrates into the exhaust pipe 53 from the bypass passage 73A.

If, for example, the outlet or the like of the exhaust pipe 53 is blocked by water or the like and thereby exhaust resistance of the exhaust pipe 53 is increased, as indicated by the arrow GA in FIG. 2, the exhaust gas can be discharged to the outside of the exhaust pipe 53 via the bypass passage 73A. The exhaust gas that has passed through the bypass passage 73A is discharged to the outside of the outboard machine 10 via an idle port 77 allowing communication between the inside of the engine cover 24 and the outside thereof.

When the engine 23 is during idling, pressure of the exhaust gas becomes relatively low. In this case, at least a part of the exhaust gas is discharged from the bypass passage 73A, making it easier to smoothly discharge the exhaust gas during idling.

As in the case illustrated in FIG. 2 where the vessel 14 is in a state of running, when the engine 23 rotates at a relatively high engine speed, pressure of the exhaust gas is relatively high, so that all or most of the exhaust gas flows along the main flow indicated by the arrow GM in FIG. 2. Thus, the exhaust gas can be sufficiently purified by the catalyst 74S.

Figure 4:
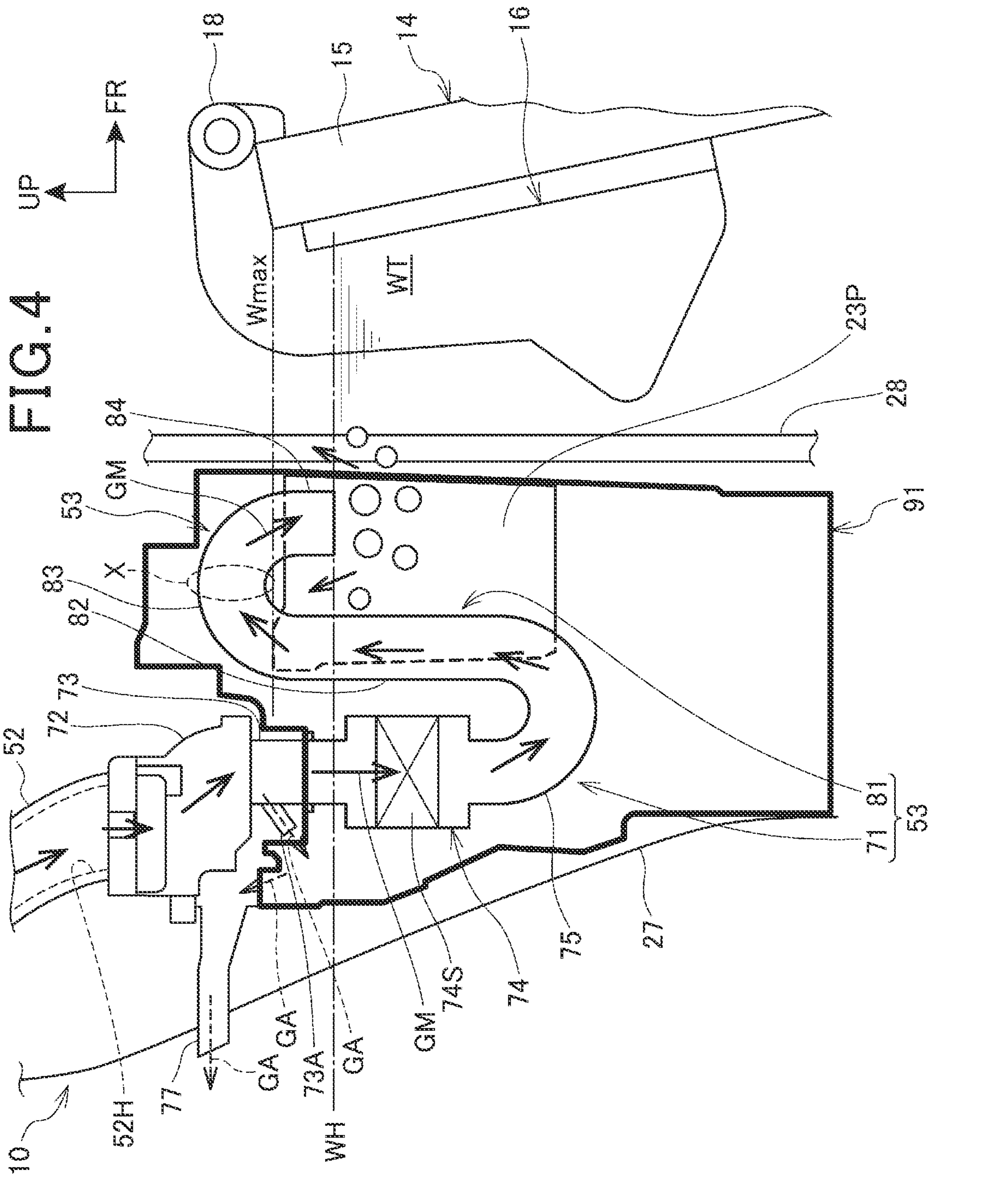
FIG. 4 is a view when the exhaust pipe when a water surface is at a draft surface on an Hi side is seen from the right side, together with the peripheral configuration.
Figure 5:
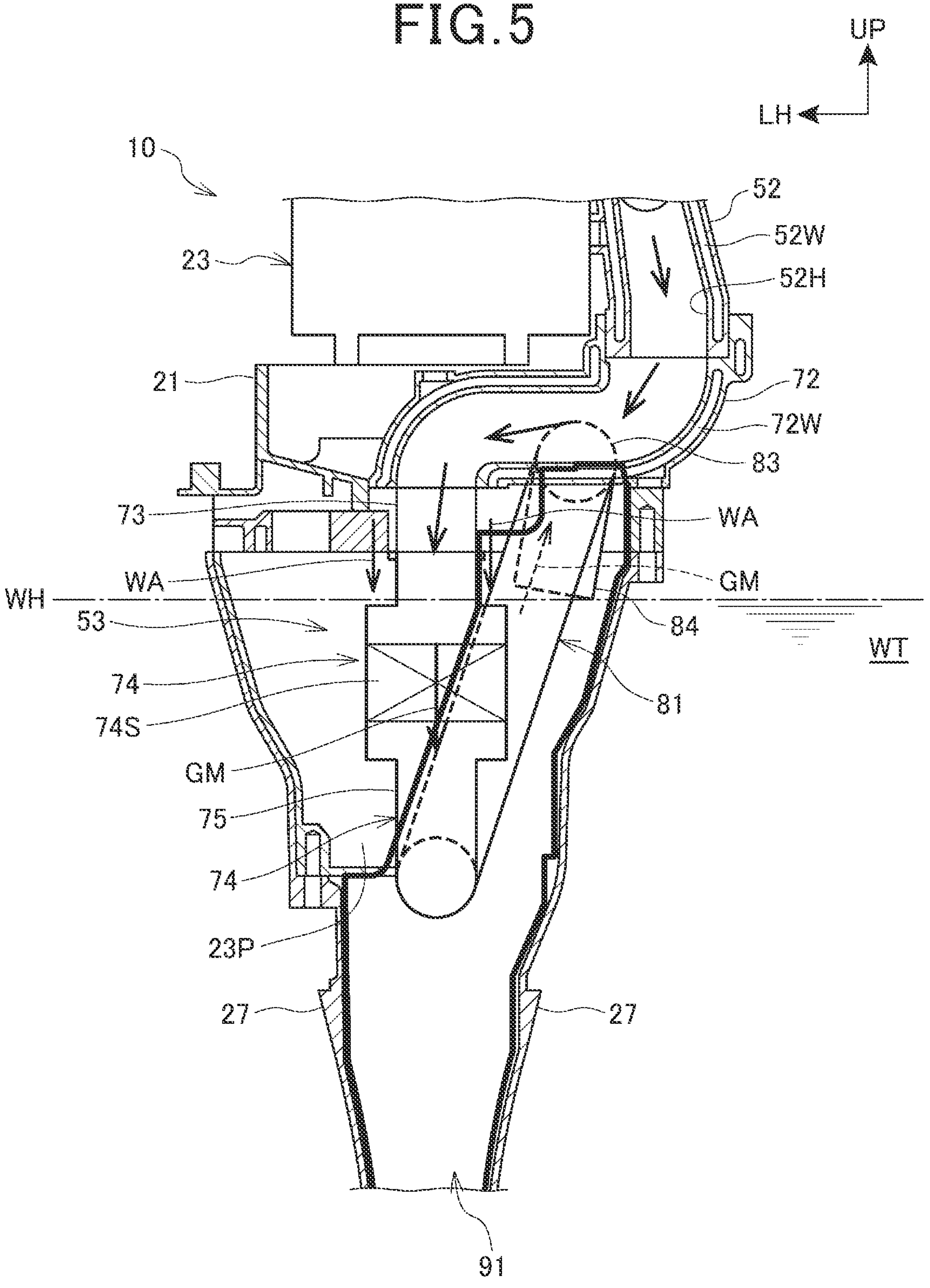
FIG. 5 is a view when the exhaust pipe when the water surface is at the draft surface on the Hi side is seen from the rear side, together with the peripheral configuration.

FIG. 4 is a view when the exhaust pipe 53 when the water surface is at the draft surface WH on the Hi side is seen from the right side, together with the peripheral configuration, and FIG. 5 is a view when it is seen from the rear side.

As illustrated in FIGS. 4 and 5, during idling or trolling, the water surface increases to the draft surface WH on the Hi side, so that the water surface increases to a position higher than the catalyst 74S. The uppermost part X of the downstream-side exhaust pipe 81 is located at a position higher than the draft surface WH, so that moisture hardly penetrates to upstream of the downstream-side bent pipe 83. Accordingly, the catalyst 74S in the upstream-side exhaust pipe 71 is prevented from being exposed to water.

As illustrated in FIGS. 4 and 5, the water surface (the draft surface WH on the Hi side) is located around the outlet of the exhaust pipe 53, so that the outlet of the exhaust pipe 53 may be blocked by water and the exhaust resistance may increase. When the exhaust resistance of the exhaust pipe 53 increases, the exhaust gas is discharged through the bypass passage 73A provided at a position higher than the draft surface WH, so that the exhaust can be continued appropriately. Furthermore, the inside of the exhaust pipe 53 and the outside thereof always communicate with each other via the bypass passage 73A, so that it is possible to prevent a situation where when the outlet of the exhaust pipe 53 is blocked by water or the like, the inside of the exhaust pipe 53 becomes high pressure and an impact sound is generated, that is, a situation where a so-called water hammer is generated.

Thus, in the present configuration, a rational catalyst layout and exhaust layout are achieved in terms of early activation of the catalyst 74S, countermeasures for exposure of the catalyst 74S to water, slimness of the front-rear length and lateral width of the outboard machine 10, countermeasures for the water hammer, and the like. Furthermore, an increase in the size of an upper part of the outboard machine 10 due to the catalyst 74S is avoided, and the lateral width is also made slim, so that the outboard machine 10 suitable even for the case where a plurality of the outboard machines 10 is set in the vessel 14 is obtained.

As described above, the exhaust pipe 53 of the present embodiment has the upstream-side exhaust pipe 71 extending downward from the engine 23 to house the catalyst 74S for exhaust gas purification, and the downstream-side exhaust pipe 81 located downstream of the upstream-side exhaust pipe 71, and extending upward from the catalyst 74S and then bending downward. Thus, even in the configuration in which the exhaust pipe 53 is disposed below the engine 23, it is advantageous for early activation of the catalyst 74S and prevention of exposure of the catalyst 74S to water. Moreover, the exhaust structure can be prevented from being complicated and increased in size, as compared with the conventional configuration in which the direction of exhaust gas is reversed upward to cause the exhaust gas to pass through the catalyst and thereafter the exhaust gas is reversed to flow downward.

Thus, under the configuration in which the exhaust pipe 53 is disposed below the engine 23, with the simple configuration, the catalyst 74S is hardly exposed to water, and the outboard machine 10 excellent in the degree of freedom of arrangement in the vessel 14 and the environment performance is obtained.

Furthermore, as illustrated in FIG. 4, the uppermost part X of the downstream-side exhaust pipe 81 is located above the maximum draft surface Wmax of the outboard machine 10, so that water hardly flows into upstream of the uppermost part X of the downstream-side exhaust pipe 81, and the catalyst 74S in the upstream-side exhaust pipe 71 is more hardly exposed to water.

Furthermore, the catalyst 74S is located below the draft surface WH on the Hi side, so that the catalyst 74S and the catalyst converter 74 can be disposed by using a space below the draft surface WH. In the case where an arrangement space is present above the draft surface WH on the Hi side, a part of the catalyst 74S or a part of the catalyst converter 74 may be disposed above the draft surface WH. That is, at least a part of the catalyst 74S or at least a part of the catalyst converter 74 is located below the draft surface WH on the Hi side, so that the space below the draft surface WH can be used effectively, making it easier to secure an arrangement space for the catalyst 74S and the catalyst converter 74.

The outboard machine 10 of the present embodiment is configured to circulate oil in the engine 23 by a dry sump method, and the catalyst 74S is disposed at a position of, in the horizontal direction, overlapping with the oil pan 23P provided at the lower part of the engine 23. According to this configuration, the oil pan 23P can be downsized as compared with a wet sump method, and the catalyst 74S is easily disposed by using a vacant space generated by the downsizing.

Furthermore, the catalyst 74S is disposed at a position of overlapping with the oil pan 23P in the front-rear direction of the outboard machine 10, and the downstream-side exhaust pipe 81 is disposed at a position of overlapping with the oil pan 23P in the left-right direction of the outboard machine 10, so that the exhaust system components including the catalyst 74S are easily effectively disposed by using a space around the oil pan 23P.

The arrangement positions of the exhaust system components including the catalyst 74S are not limited to the above positions and may be appropriately changed according to the space around the oil pan 23P and the like. Furthermore, the oil pan 23P may be increased in size within a range capable of disposing the exhaust system components including the catalyst 74S. In the case where the oil pan 23P is increased in size, a wet sump method or the like may be used to circulate oil in the engine 23.

Furthermore, the upstream-side exhaust pipe 71 has, above the catalyst 74S, the bypass passage 73A that functions as a communication hole allowing communication between the inside of the upstream-side exhaust pipe 71 and the outside thereof, so that a situation where a so-called water hammer is generated can be prevented.

The above embodiment is merely an embodiment of the present invention, and any modifications and applications are possible without departing from the gist of the present invention.

Figure 6:
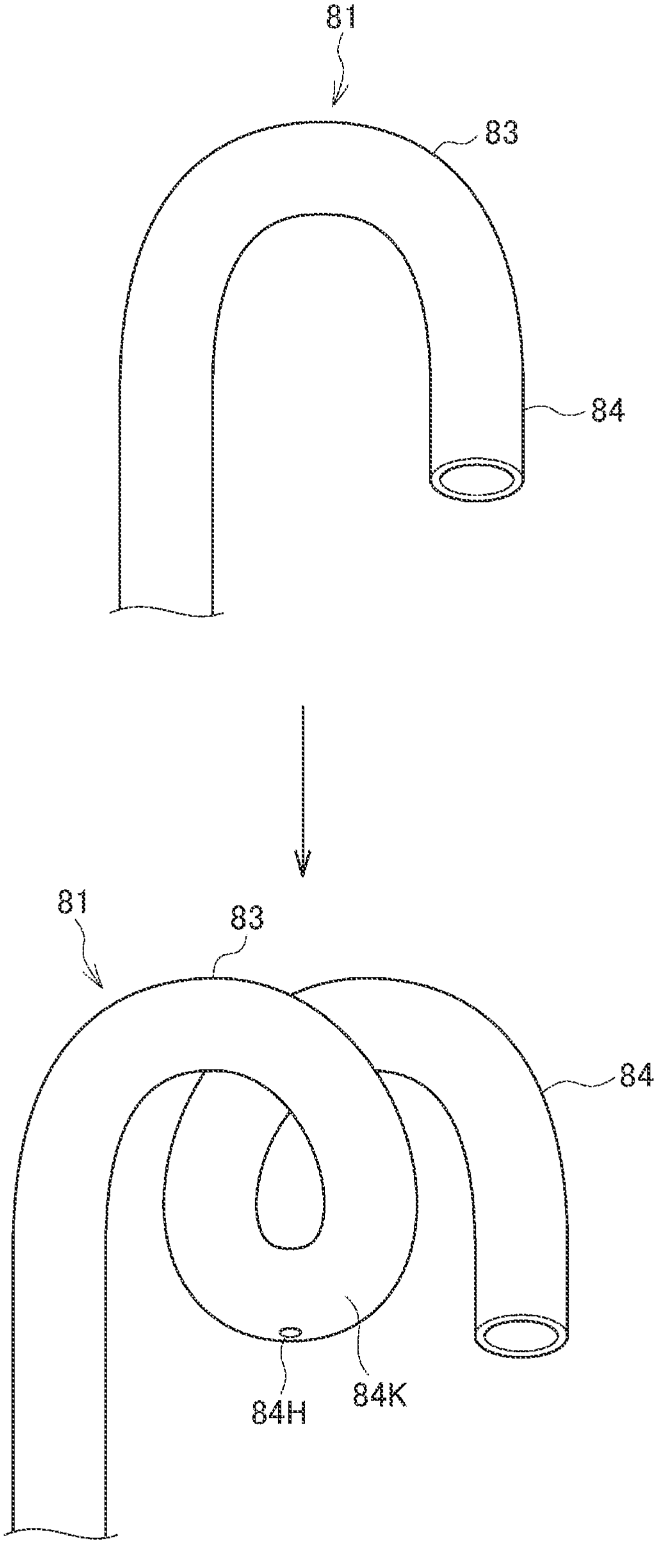
FIG. 6 is a view for describing a modification.

For example, the shape and structure of each part (the upstream-side exhaust pipe 71, the downstream-side exhaust pipe 81) of the exhaust pipe 53 may be changed appropriately. As an example, although the case has been exemplified where the second downstream-side exhaust pipe 84 linearly extending downward from the downstream-side bent pipe 83 is provided in the downstream-side exhaust pipe 81 as indicated in the upper side of FIG. 6, a rotary exhaust pipe part 84K forming an exhaust path that rotates exhaust gas once or more in a side view of the outboard machine 10 may be provided between the downstream-side bent pipe 83 and the second downstream-side exhaust pipe 84 as indicated in the lower side of FIG. 6.

If water penetrates into the second downstream-side exhaust pipe 84, the water can remain in the rotary exhaust pipe part 84K, so that a situation where the catalyst 74S is exposed to water can be further prevented. As indicated in the lower side of FIG. 6, in the case where the rotary exhaust pipe part 84K is provided with a drain hole 84H, the water remaining in the rotary exhaust pipe part 84K can be discharged quickly.

The rotary exhaust pipe part 84K is not limited to the above configuration and may be an exhaust path that rotates exhaust gas once or more in a back view of the outboard machine 10 (similarly, in a front view). In short, an exhaust path that rotates exhaust gas in the up-down direction once or more is widely applicable.

The engine 23 is not limited to a gasoline engine and may be another engine that requires exhaust purification, such as a diesel engine. For the catalyst 74S, an appropriate catalyst may be selected according to the engine 23. For example, in the case of a diesel engine, a catalyst suitable for a diesel engine, such as a selection catalyst reduction (SCR) catalyst or a soot catalyst, may be used.

Furthermore, although the case where the present invention is applied to the outboard machine 10 illustrated in FIG. 1 and the like has been described, the present invention may be applied to known other outboard machines. In this case, the shapes and positions of the exhaust manifold 52, the exhaust pipe 53, and the like which form the exhaust system components 51 may be appropriately changed according to the engine 23, a vacant space around the engine 23, and the like.

REFERENCE SIGNS LIST

10 outboard machine
12 outboard machine body
14 vessel
16 attachment part
23 engine
23P oil pan
24 engine cover
27 extension cover
28 driving shaft
41 intake system components
51 exhaust system components
52 exhaust manifold
52W, 72W water jacket
53 exhaust pipe
71 upstream-side exhaust pipe
72 exhaust guide
73 first upstream-side exhaust pipe
73A bypass passage
74 catalyst converter
74S catalyst
75 second upstream-side exhaust pipe
81 downstream-side exhaust pipe
82 first downstream-side exhaust pipe
83 downstream-side bent pipe
84 second downstream-side exhaust pipe
84K rotary exhaust pipe part
84H drain hole
91 exhaust chamber
W engine cooling water
Wmax maximum draft surface
WH draft surface on Hi side
WL draft surface on Lo side
WT underwater
X uppermost part of downstream-side exhaust pipe

The invention claimed is:

1. An outboard machine comprising:
an engine provided at a position higher than a water surface; and
an exhaust pipe disposed in a space below the engine, wherein the outboard machine is configured to circulate oil in the engine by a dry sump method, the exhaust pipe comprises:

an upstream-side exhaust pipe extending downward from the engine;

a catalyst for exhaust gas purification located upstream of and above a lower end of the upstream-side exhaust pipe; and a downstream-side exhaust pipe located downstream of the upstream-side exhaust pipe, the downstream-side exhaust pipe extending upward from the catalyst and then bending downward, and the catalyst is disposed outside of an oil pan provided at a lower part of the engine and is disposed at a position of, in a horizontal direction, overlapping with the oil pan.

2. The outboard machine according to claim 1, wherein an uppermost part of the downstream-side exhaust pipe is located above a draft surface of the outboard machine.

3. The outboard machine according to claim 1, wherein at least a part of the catalyst is located below a draft surface on an Hi side indicating a water surface during either idling or trolling.

4. The outboard machine according to claim 1, wherein the catalyst is disposed at a position of overlapping with the oil pan in a front-rear direction of the outboard machine, and the downstream-side exhaust pipe is disposed at a position of overlapping with the oil pan in a left-right direction of the outboard machine.

5. The outboard machine according to claim 1, wherein the upstream-side exhaust pipe comprises, above the catalyst, a communication hole allowing communication between an inside of the upstream-side exhaust pipe and an outside of the upstream-side exhaust pipe.

6. The outboard machine according to claim 1, wherein the downstream-side exhaust pipe comprises a rotary exhaust pipe part forming an exhaust path that rotates exhaust gas in an up-down direction once or more.

7. The outboard machine according to claim 6, wherein the rotary exhaust pipe part is provided with a drain hole.

8. The outboard machine according to claim 2, wherein at least a part of the catalyst is located below a draft surface on an Hi side indicating a water surface during either idling or trolling.

9. The outboard machine according to claim 2, wherein the upstream-side exhaust pipe comprises, above the catalyst, a communication hole allowing communication between an inside of the upstream-side exhaust pipe and an outside of the upstream-side exhaust pipe.

10. The outboard machine according to claim 3, wherein the upstream-side exhaust pipe comprises, above the catalyst, a communication hole allowing communication between an inside of the upstream-side exhaust pipe and an outside of the upstream-side exhaust pipe.

11. The outboard machine according to claim 4, wherein the upstream-side exhaust pipe comprises, above the catalyst, a communication hole allowing communication between an inside of the upstream-side exhaust pipe and an outside of the upstream-side exhaust pipe.

12. The outboard machine according to claim 2, wherein the downstream-side exhaust pipe comprises a rotary exhaust pipe part forming an exhaust path that rotates exhaust gas in an up-down direction once or more.

13. The outboard machine according to claim 3, wherein the downstream-side exhaust pipe comprises a rotary exhaust pipe part forming an exhaust path that rotates exhaust gas in an up-down direction once or more.

14. An outboard machine comprising:

an engine provided at a position higher than a water surface; and an exhaust pipe disposed in a space below the engine, wherein the exhaust pipe comprises:

an upstream-side exhaust pipe extending downward from the engine;

a catalyst for exhaust gas purification located upstream of and above a lower end of the upstream-side exhaust pipe; and a downstream-side exhaust pipe located downstream of the upstream-side exhaust pipe, the downstream-side exhaust pipe extending upward from the catalyst and then bending downward, and the upstream-side exhaust pipe comprises, above the catalyst, a communication hole allowing communication between an inside of the upstream-side exhaust pipe and an outside of the upstream-side exhaust pipe.

15. An outboard machine comprising:

an engine provided at a position higher than a water surface; and an exhaust pipe disposed in a space below the engine, wherein the exhaust pipe comprises:

an upstream-side exhaust pipe extending downward from the engine;

a catalyst for exhaust gas purification located upstream of and above a lower end of the upstream-side exhaust pipe; and a downstream-side exhaust pipe located downstream of the upstream-side exhaust pipe, the downstream-side exhaust pipe extending upward from the catalyst and then bending downward, and the downstream-side exhaust pipe comprises a rotary exhaust pipe part forming an exhaust path that rotates exhaust gas in an up-down direction once or more.

16. The outboard machine according to claim 15, wherein the rotary exhaust pipe part is provided with a drain hole.

* * * * *